(12) United States Patent
Imai et al.

(10) Patent No.: US 6,663,724 B2
(45) Date of Patent: Dec. 16, 2003

(54) MOLTEN SALT COMPOSITION FOR USE IN MANUFACTURING LAMINATED RINGS

(75) Inventors: Hitoshi Imai, Sayama (JP); Katsuyuki Nakajima, Sayama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 13 days.

(21) Appl. No.: 10/036,424

(22) Filed: Jan. 7, 2002

(65) Prior Publication Data

US 2002/0139445 A1 Oct. 3, 2002

Related U.S. Application Data (62) Division of application No. 09/578,692, filed on May 26, 2000, now Pat. No. 6,379,473.

(30) Foreign Application Priority Data

May 31, 1999 (JP) ............................................ 11-151924
May 28, 1999 (JP) ............................................ 11-150586
May 28, 1999 (JP) ............................................ 11-150627

(51) Int. Cl.$^7$ ................................................. C23C 8/50
(52) U.S. Cl. ........................ 148/234; 148/230; 148/231; 148/228
(58) Field of Search ............................... 148/234, 230, 148/231, 228

(56) References Cited

U.S. PATENT DOCUMENTS 4,492,604 A  *  1/1985  Muller et al. ............... 148/228

FOREIGN PATENT DOCUMENTS

JP          A10121130         5/1998

OTHER PUBLICATIONS

English abstract of Japanese patent 55034623A, published Mar. 11, 1980.*

* cited by examiner

*Primary Examiner*—Deborah Yee
(74) *Attorney, Agent, or Firm*—Birch, Stewart, Kolasch & Birch, LLP (57) ABSTRACT

A laminated ring for use as a belt in transmitting power in a continuously variable transmission is produced by welding opposite ends of a sheet of maraging steel to produce a plurality of rings, and rolling said rings to a predetermined length. The rings are nitrided in a salt-bath nitriding process by dipping the rings in a molten salt containing 38–46% of $CNO^-$ and 1–2% of $CN^-$ and heated to a temperature in the range from 480 to 530° C., for a period of time ranging from 10 to 25 minutes. The nitrided rings are finally stacked into a laminated ring.

4 Claims, 7 Drawing Sheets

MOLTEN SALT COMPOSITION FOR USE IN MANUFACTURING LAMINATED RINGS

This application is a divisional of co-pending Application No. 09/578,692, filed on May 26, 2000 now U.S. Pat. No. 6,379,473 issued Apr. 30, 2002, the entire contents of which are hereby incorporated by reference and for which priority is claimed under 35 U.S.C. §120; and this application claims priority of Application No. 150586/11; 150627/11; 151924/11 filed in JAPAN on May 28, May 28 and May 31, 1999 repectively under 35 U.S.C. §119.

BACKGROUND OF THE INVENTION

1. Field of the Invention

The present invention relates to a method of manufacturing a laminated ring for use as a belt in transmitting power in a continuously variable transmission, and a molten salt composition for use in such a method.

2. Description of the Related Art

Continuously variable transmissions have a power transmitting belt trained around a pair of pulleys. The power transmitting belt comprises a laminated ring composed of a plurality of rings and mounted on and held by an element of predetermined shape.

The laminated ring is straight in shape when traveling between the pulleys, and curved in shape when running along the pulleys. The laminated ring undergoes severe bending deformations due to repetitive cycles of the straight and curved states. Therefore, the laminated ring is required to have a mechanical strength large enough to withstand the severe bending deformations. Heretofore, it has been customary to produce a laminated ring by welding the opposite ends of a sheet of maraging steel to form a cylindrical drum, severing the cylindrical drum into rings, and rolling the rings to a predetermined length.

The maraging steel is a low-carbon steel containing 17 to 19% of Ni, and Co, Mo, Ti, etc. When the maraging steel is heated to a suitable temperature after being subjected to a solution treatment, it causes age hardening in a martensitic state, resulting in an ultra-high strength steel that is highly strong and highly tough. The maraging steel is highly suitable for use as the material of the laminated ring used under severe conditions because of the high strength and the high tenacity.

In as much as the maraging steel should desirably have wear resistance and fatigue-resistant strength for use as the material of the laminated ring, it is the customary practice to perform case-hardening on the maraging steel.

For example, the maraging steel is case-hardened by effecting a gas nitriding or gas soft-nitriding process on the rolled rings. However, since the gas nitriding or gas soft-nitriding process alone is not effective enough to activate the surface of the steel, the process needs to be preceded by a solution treatment which heats the rings to a temperature range from the recrystallization temperature of the maraging steel to 830° C. When the rings are heated to the above temperature range, circumferential lengths of the rings are required to be corrected to eliminate heat-treatment strains caused by the heating and an aging process is needed to stabilize a temperature distribution in a subsequent nitriding process.

Therefore, the gas nitriding or gas soft-nitriding process is disadvantageous in that it requires a complex process after the rolling process, and also that gas nitriding or gas soft-nitriding process itself is time-consuming.

One solution is to replace the gas nitriding or gas soft-nitriding process with a salt-bath nitriding process. In the salt-bath nitriding process, the rings are dipped in a molten salt containing potassium cyanate (KCNO) or sodium cyanate (NaCNO) that is produced when a major component of potassium cyanide (KCN) or sodium cyanide (NaCN) reacts with air. The salt-bath nitriding process is referred to as tufftriding process named after the tradename name of the molten salt.

The molten salt contains, in addition to KCN or NaCN and KCNO or NaCNO, potassium carbonate ($K_2CO_3$) or sodium carbonate ($Na_2CO_3$), with CNO in the range from 31 to 35% and CN in the range from 1 to 2%. The molten salt is used while being heated to a temperature in the range from 570 to 580° C. The salt-bath nitriding process using the molten salt activates the surface of the ring due to decomposition of KCNO or NaCNO and nitrides of the surface of the ring with nitrogen produced by the decomposition of KCNO or NaCNO. The salt-bath nitriding process can be finished in a period of time much shorter than the gas nitriding or gas soft-nitriding process. The salt-bath nitriding process can be performed on the rings immediately after the rings are rolled, without the need for the solution treatment, the circumferential length correction, and the aging process which are required in the case of the gas nitriding or gas soft-nitriding process.

One problem with the salt-bath nitriding process is that because the nitriding process progresses in a short period of time, the thickness of nitride layers formed in the surfaces of the rings changes greatly per unit time, making it difficult to obtain nitride layers of appropriate thickness. If the thickness of the nitride layers is too small, then a desired level of wear resistance and fatigue-resistant strength cannot be achieved. If the thickness of the nitride layers is too large, then an age-hardened layer inwardly of the nitride layer is reduced, failing to obtain a desired level of strength.

The rings exhibit such a tendency that their volume tend to increase in their surfaces because of the formation of the nitride layers, and tend to decrease inwardly wardly of the surfaces because of the formation of the age-hardened layer. As a result, the rings suffer dimensional changes such as circumferential length changes in order to keep the structure stable. According to the salt-bath nitriding process, the circumferential length of the rings tend to increase as a whole because the expansion of the surface layers due to the formation of the nitride layers is greater than the shrinkage that occurs inwardly of the surface layers.

It is desirable that the thickness of nitride layers formed by the salt-bath nitriding process be controlled appropriately.

To solve the above problems, the present applicant has proposed a process for dipping rings in a salt bath in which a molten salt containing 31–35% of $CNO^-$ and 1–2% of $CN^-$ is heated to 520–530° C., for a period of time ranging from 10 to 25 minutes (see Japanese laid-open patent publication No. 10-121130). According to the proposed process, the temperature of the salt bath is lower than the conventional temperature ranging from 570 to 580° C. to reduce a change per unit time in the thickness of nitride layers formed in the surfaces of the rings for thereby making it easier to control the thickness of the formed nitride layers.

However, when the molten salt containing 31–35% of $CNO^-$ and 1–2% of $CN^-$ is heated to 520–530° C. to carry out the salt-bath nitriding process, a carbonate is separated out, and the composition of the salt bath changes easily. With the carbonate being separated out, the salt bath tank becomes shallow, making it impossible to fully dip the rings in the salt bath, and the temperature distribution in the salt bath becomes irregular, making uneven the thickness of the nitride layers and the aged hardness. The service life of the salt bath tank is shortened because the separated carbonate stores heat.

Another problem is that when the salt-bath nitride process is performed while the carbonate is being separated out, a white compound is separated out on the rings dipped in the salt bath.

SUMMARY OF THE INVENTION

It is therefore an object of the present invention to provide a method of manufacturing a laminated ring by easily producing rings having nitride layers of appropriate thickness.

To achieve the above object, there is provided a method of manufacturing a laminated ring for use as a belt in transmitting power in a continuously variable transmission, comprising the steps of welding opposite ends of a sheet of maraging steel to produce a plurality of rings, rolling the rings to a predetermined length, nitriding the rings in a salt-bath nitriding process by dipping the rings in a molten salt containing 38–46% of $CNO^-$ and 1–2% of $CN^-$ and heated to a temperature in the range from 480 to 530° C., for a period of time ranging from 10 to 25 minutes, and stacking the rings into a laminated ring.

The molten salt can be prepared by melting, with heat, a molten salt composition which contains 3–4 of potassium cyanide (KCN) or sodium cyanide (NaCN), and 89–91% of potassium cyanate (KCNO) or sodium cyanate (NaCNO), and the remainder of potassium carbonate ($K_2CO_3$) or sodium carbonate ($Na_2CO_3$).

With the molten salt composition containing 38–46% of $CNO^-$ and 1–2% of $CN^-$, even when the temperature of the molten salt is in the range from 480 to 530° C. which is lower than the conventional range from 570 to 580° C., no carbonate is separated out. Therefore, the nitriding process on the surface of the ring can easily be controlled to produce a nitride layer of appropriate thickness and prevent a white compound from being separated out on the surface of the ring. The molten salt composition thus selected is effective to improve a carbo-nitriding action to produce a ring having excellent surface hardness and fatigue-resistant strength.

If $CNO^-$ were less than 38%, then a carbonate might be separated out in the temperature range from 480 to 530° C. If $CNO^-$ were more than 46%, then the surface roughness of the ring might be increased to reduce the thickness of the nitride layer formed in the surface of the ring.

In the method according to the present invention, $CN^-$ serves as a buffer. If $CN^-$ falls out of the above range, it is impossible to keep $CNO^-$ in the appropriate range.

If the temperature of the salt bath were less than 480° C., then a carbonate might be separated out. If the temperature of the salt bath exceeded 530° C., then the thickness of the nitride layer formed in the surface of the ring would change greatly per unit time, making it difficult to obtain a nitride layer of appropriate thickness. The temperature of the salt bath should preferably be in the range from 520 to 530° C. to reliably prevent a carbonate from being separated out.

If the ring were dipped in the salt bath for a period of time less than 10 minutes, no desired aged hardness would be achieved. If the ring were dipped in the salt bath for a period of time longer than 25 minutes, then the thickness of the nitride layer formed in the surface of the ring would be excessive.

The rings are nitrided according to the salt-bath nitriding process such that the nitride layer formed in the surface of each of the rings has a thickness ranging from 20 to 40% of the overall thickness of the ring.

Because the thickness of the nitride layer ranges from 20 to 40% of the overall thickness of the ring, the expansion of the ring due to the formation of the nitride layer in the surface of the ring and the shrinkage of the ring due to the internal aging thereof are balanced to minimize changes in the circumferential length of the ring. If the thickness of the nitride layer were smaller than 20 of the overall thickness of the ring, then the shrinkage of the ring due to the internal aging thereof would be increased, tending to reduce the circumferential length of the ring. If the thickness of the nitride layer were greater than 40 of the overall thickness of the ring, then the expansion of the ring due to the formation of the nitride layer in the surface of the ring would be increased, tending to increase the circumferential length of the ring.

Since the rings manufactured by the method according to the present invention have small circumferential lengths variations and excellent dimensional stability, the rings have a desired level of tensile strength and fatigue-resistant strength.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Maraging steel used in the embodiment of the present invention is a low-carbon steel containing 0.03% or less of C, 0.10% or less of Si, 0.10% or less of Mn, 0.01% or less of P, and 0.01% of S, and a 18%-Ni steel containing 18–19% of Ni, 4.7–5.2% of Mo, 0.05–0.15% of Al, 0.50–0.70% of Ti, and 8.5–9.5% of Co.

Figure 1A:
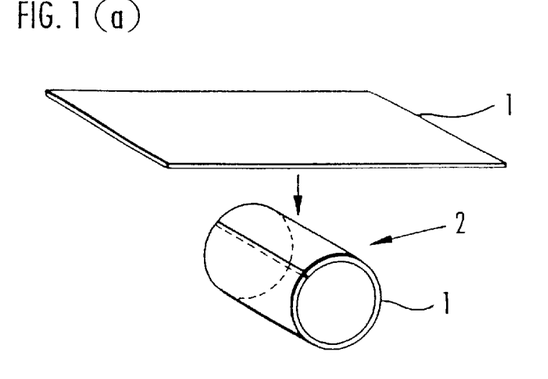
FIGS. 1(a) through 1(c) are views schematically showing successive steps of a method of manufacturing a laminated ring according to the present invention.

In a method of manufacturing a laminated ring according to the present invention, as shown in FIG. 1(a), a thin sheet 1 of maraging steel of the above composition is bent into a loop, whose opposite ends are welded to each other to produce a cylindrical drum 2. The cylindrical drum 2 is placed in a vacuum furnace and kept at a temperature in the range from 820 to 830° C. for a period of time raging from 20 to 60 minutes in a solution treatment process. The solution treatment process thus carried out reorients crystals in the maraging steel to remove welding strains.

Figure 1B:
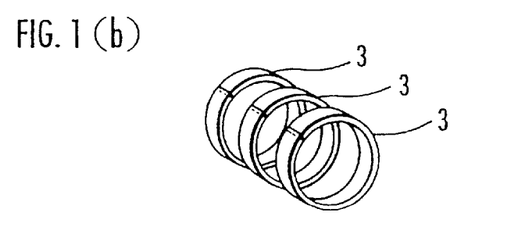

Thereafter, as shown in FIG. 1(b), the cylindrical drum 2 severed into ring-shaped bodies 3 of certain width. The ring-shaped bodies 3 have their edges burred due to the severance. The burred edges are beveled off by a barrel grinding process. Thereafter, the ring-shaped bodies 3 are cold-rolled by a rolling reduction ranging from 40 to 50%, thus producing rings 4 rolled to a predetermined circumferential length.

Figure 1C:
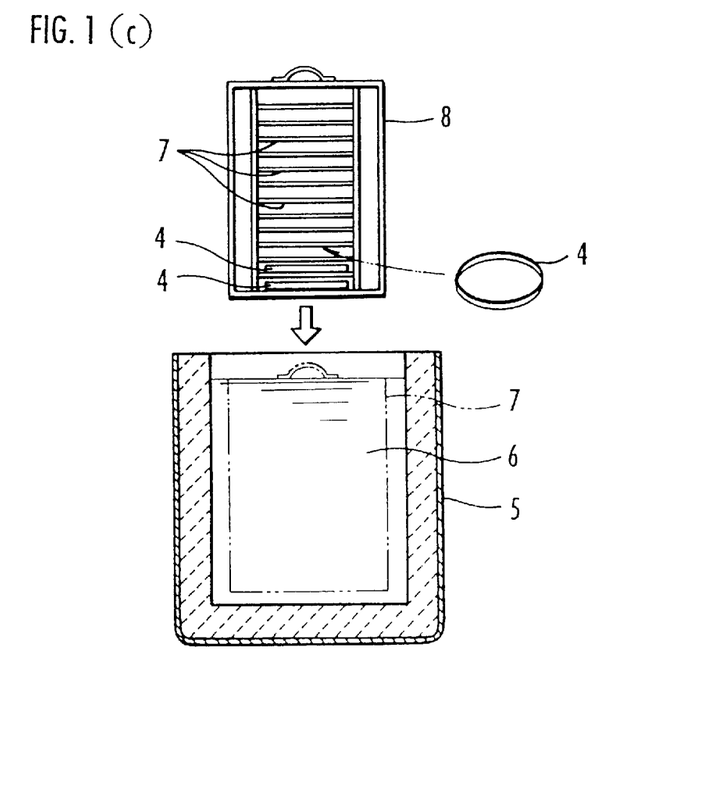

Then, as shown in FIG. 1(c), the rings 4 are dipped in a molten salt 6 stored in a salt bath tank 5 to carry out a salt-bath nitriding process. In the salt-bath nitriding process, a dipping jig 8 having a plurality of shelves 7 is employed, the rings 4 are placed horizontally on the respective shelves 7, and the dipping jig 8 with the rings 4 stored therein is dipped in the molten salt 6.

The molten salt 6 comprises a molten salt composition comprising 3–4% of KCN or NaCN, 89–91 of KCNO or NaCNO, and the remainder of $K_2CO_3$ or $Na_2CO_3$ and heated to a molten state. The molten salt 6 contains 38–46% of $CNO^-$ and 1–2% of $CN^-$, and is heated to a temperature in the range from 480 to 530° C.

If the ratio of $CNO^-$ in the composition were too low, the ratio of a carbonate such as $K_2CO_3$ or $Na_2CO_3$ would relatively be increased. If the ratio of $CNO^-$ in the composition were too high, the ratio of the carbonate would be lowered. The carbonate is separated out unless the relationship between the ratio of $CNO^-$ in the composition and the temperature of the molten salt 6 is appropriate.

Figure 2:
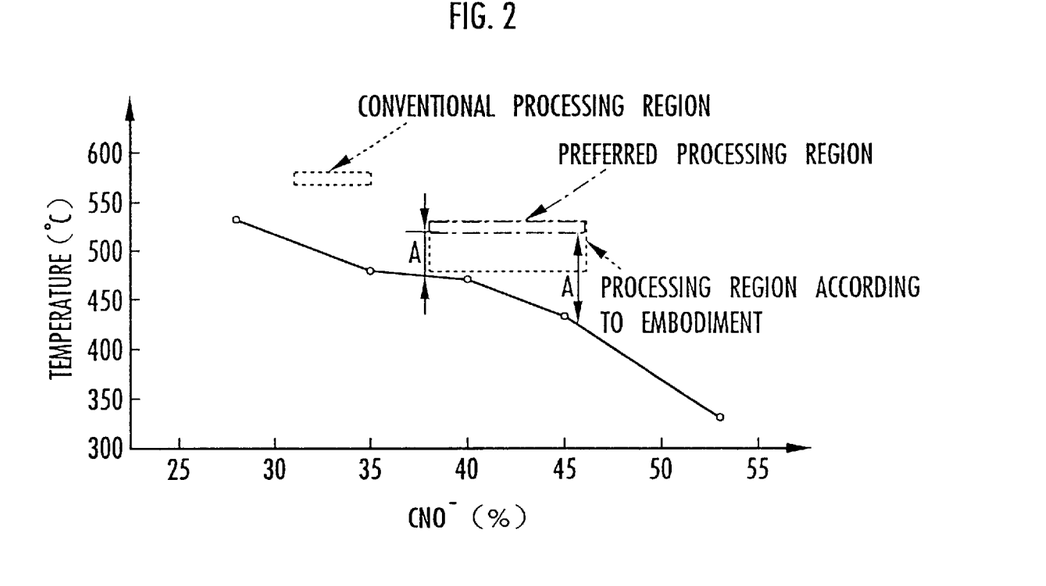
FIG. 2 is a graph showing the relationship between the ratio of $CNO^-$ of a molten salt and the temperature at which a carbonate is separated out from the molten salt.

FIG. 2 showing the relationship between the ratio of $CNO^-$ in the composition of the molten salt 6 and the temperature at which the carbonate is separated out from the molten salt 6.

It can be seen from FIG. 2 that with a conventional molten salt where the ratio of $CNO^-$ in the composition is in the range from 31 to 35%, if the temperature of the molten salt is in the range from 520 to 530° C., a back margin with respect to the temperature at which the carbonate is separated out is small, allowing the carbonate to be easily separated out. In order to prevent the carbonate from being separated out from the conventional molten salt, it is necessary to keep the temperature of the molten salt in the range from 570 to 580° C. to increase a back margin with respect to the temperature at which the carbonate is separated out.

With the molten salt 6 according to the illustrated embodiment, since the ratio of $CNO^-$ in the composition is equal to or higher than 38% and less than 46%, the carbonate is prevented from being separated out even if the temperature of the molten salt 6 is in the range from 480 to 530° C.

In the present embodiment, in order to prevent the carbonate from being separated out, the temperature of the molten salt 6 should preferably be in the range from 520 to 530° C. With the temperature of the molten salt 6 in the range from 520 to 530° C, a back margin A with respect to the temperature at which the carbonate is separated out is increased for thereby reliably preventing the carbonate from being separated out, as shown in FIG. 2.

Figure 3:
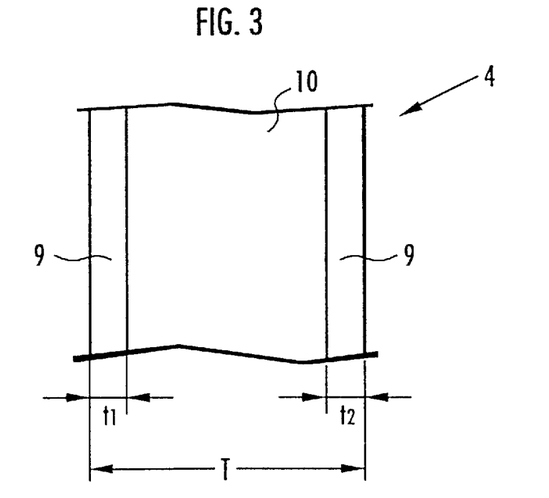
FIG. 3 is a schematic cross-sectional view of a ring with nitride layers formed therein.

In the salt-bath nitriding process using the molten salt, as shown in FIG. 3, a ring 4 is obtained which has nitride layers 9 in opposite surfaces thereof and an age-hardened layer 10 disposed inwardly of and between the nitride layers 9. The ring 4 has a high level of strength and tenacity inherent in the maraging steel, which is achieved by the age-hardened layer 10. The nitride layers 9 are effective to harden the surfaces of the ring 4, which hence has wear resistance and fatigue-resistant strength in addition to the high level of strength and tenacity.

Figure 4:
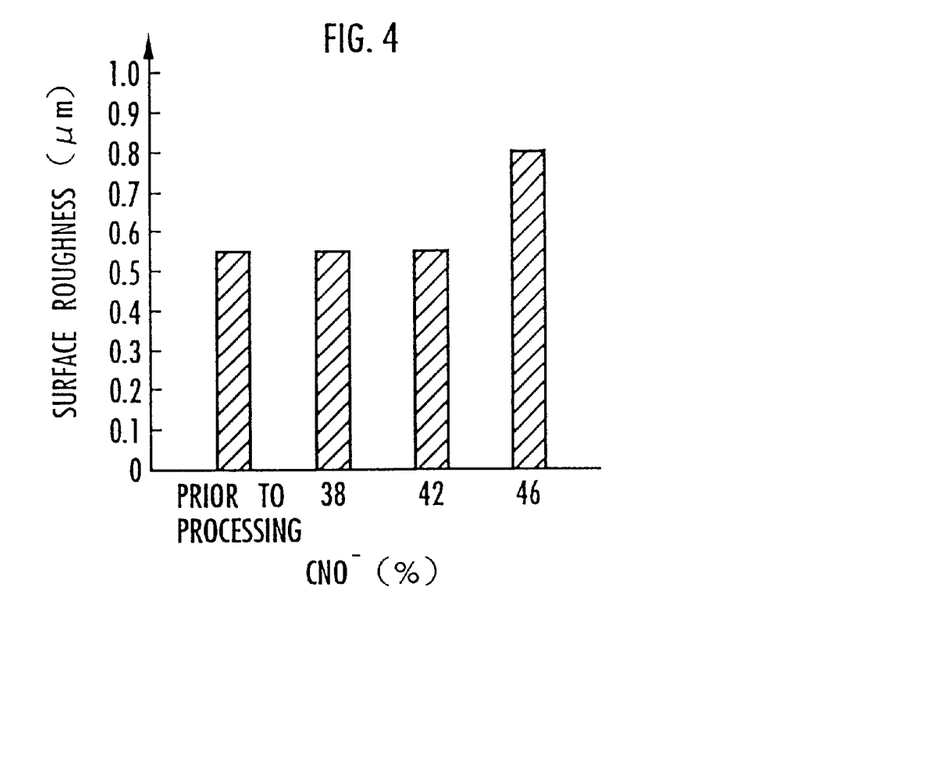
FIG. 4 is a histogram showing the relationship between the ratio of $CNO^-$ of a molten salt and the surface roughness of a ring.
Figure 5:
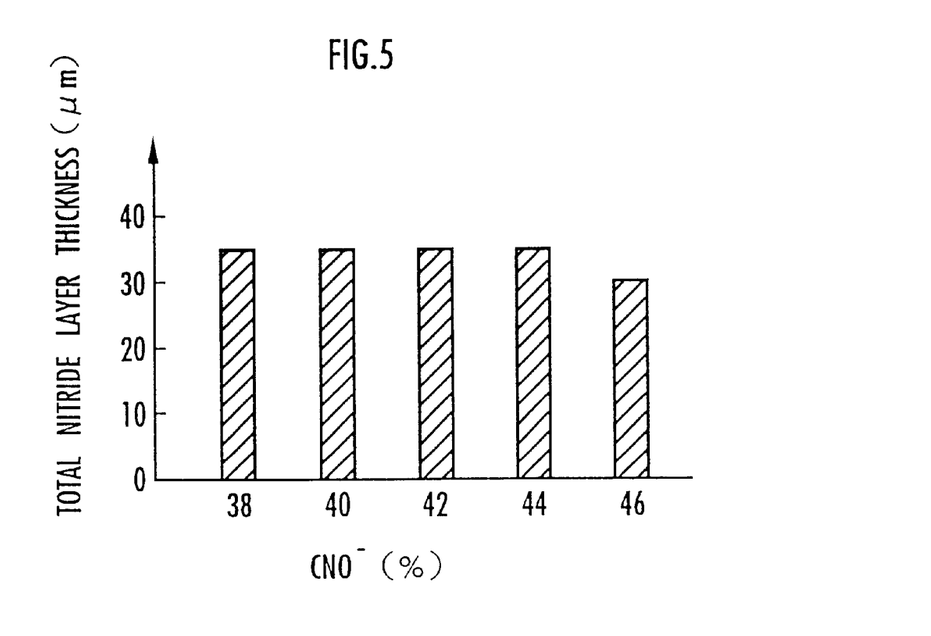
FIG. 5 is a histogram showing the relationship between the ratio of $CNO^-$ of a molten salt and the thickness of all nitride layers formed in the surfaces of a ring.

In the salt-bath nitriding process, the ring 4 is nitrided while the surfaces of the ring 4 are being activated by the molten salt 6. Depending on the ratio of $CNO^-$ in the composition of the molten salt 6, the surface roughness of the ring 4 increases, reducing the formed nitride layers 9. With respect to the reduction in the nitride layers 9, FIG. 4 shows the relationship between the ratio of $CNO^-$ in the composition and the surface roughness of the ring 4 when the ratio of $CNO^-$ in the composition is varied and the ring 4 is dipped in the molten salt 6 heated to 525° C. FIG. 5 shows the relationship between the ratio of $CNO^-$ and the thickness of all the nitride layers, i.e., the total thickness of the nitride layers 9 in the opposite surfaces.

When the ratio of $CNO^-$ in the composition of the molten salt reaches 46%, the surface roughness increases as shown in FIG. 4, and the thickness of the nitride layers 9 decreases as shown in FIG. 5. As described above with reference to FIG. 2, since the carbonate tends to be separated out when the ratio of $CNO^-$ becomes less than 38%, it is appropriate to keep the ratio of $CNO^-$ in the composition within the range from 38 to 46%.

Referring back to FIG. 3, if the nitride layers 9 have respective thicknesses $t_1$, $t_2$ and the ring 4 has a overall thickness T, then the ratio B (%) of the thickness of the nitride layers 9 to the overall thickness T of the ring 4 is represented by the following equation:

$$B=(t_1+t_2)/T\times100$$

In the present embodiment, the salt-bath nitriding process is carried out to keep the ratio B in the range from 20 to 40 (%) by dipping the ring 4 in the molten salt 9 containing 38–46% of $CNO^-$ and 1–2% of $CN^-$ and heated to a temperature in the range from 480 to 530° C., for a period of time ranging from 10 to 25 minutes.

Figure 6:
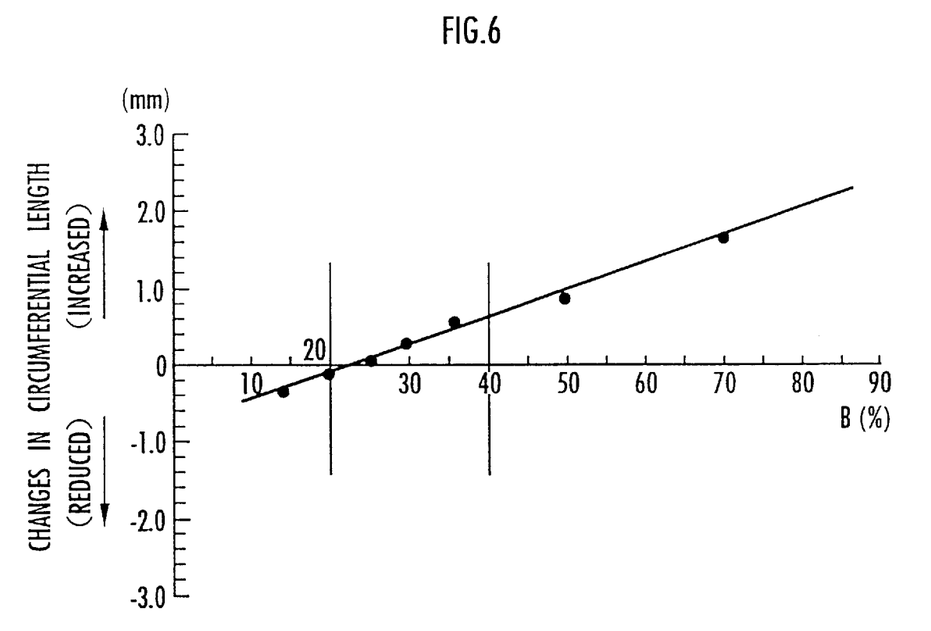
FIG. 6 is a graph showing the relationship between the ratio of the thickness of nitride layers to the overall thickness of a ring and changes in the circumferential length of the ring.

FIG. 6 shows the relationship between the ratio B (%) of the thickness of the nitride layers 9 to the overall thickness of the ring 4 and the circumferential length of the ring 4. A study of FIG. 6 reveals that when the ratio B is 20%, the circumferential length of the ring 4 is shortened only by 0.1 mm, and when the ratio B is 40%, the circumferential length of the ring 4 is increased only by 0.6 mm. Consequently, it can be seen from FIG. 6 that since the ratio B is in the range from 20 to 40%, the nitrided rings 4 according to the present embodiment suffer very small circumferential length variations and hence are highly dimensionally stable.

Figure 7:
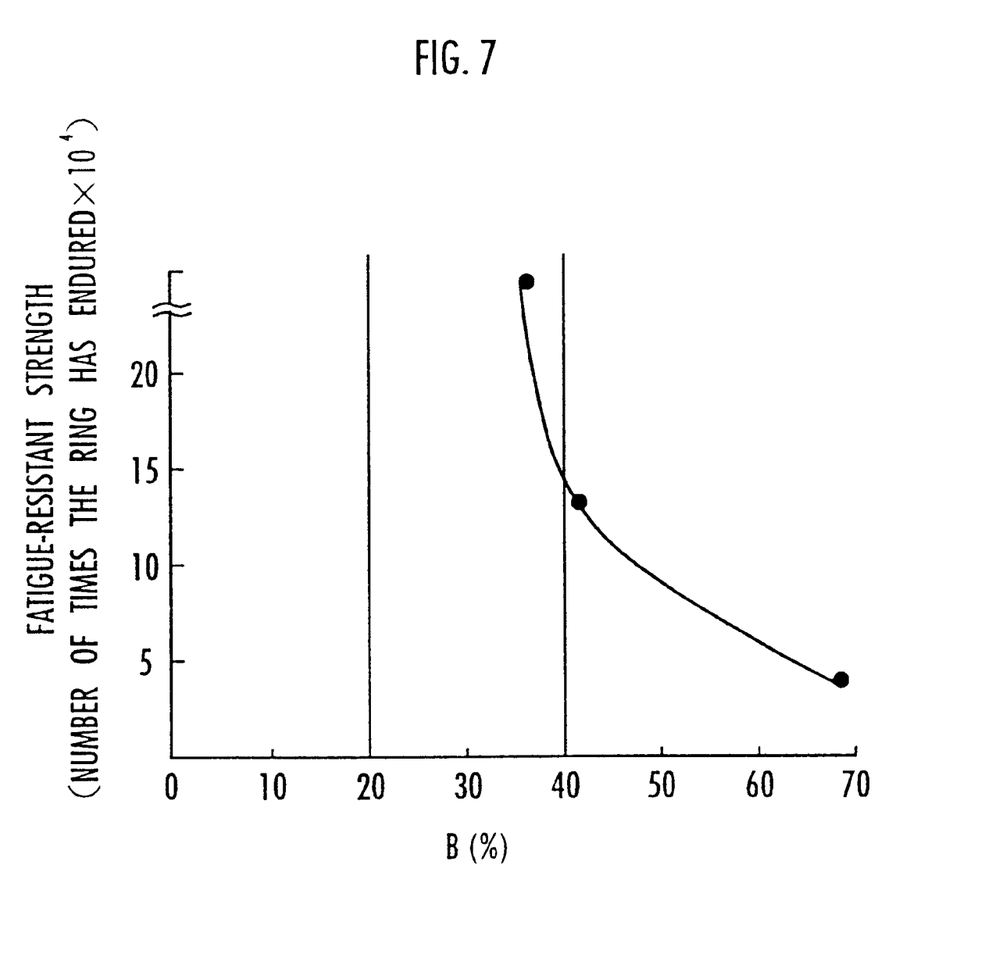
FIG. 7 is a graph showing the relationship between the ratio of the thickness of nitride layers to the overall thickness of a ring and the fatigue-resistant strength of the ring.

FIG. 7 shows the relationship between the ratio B (%) of the thickness of the nitride layers 9 to the over-all thickness of the ring 4 and the fatigue-resistant strength of the ring 4. In FIG. 7, the ring 4 is used in a laminated ring as a continuously variable transmission belt, and the fatigue-resistant strength is shown as an indication of the number of times the ring 4 has endured until it is broken.

It can be seen from FIG. 7 that the number of times the salt-bath-nitrided ring 4 according to the present embodiment has endured until it is broken is about 4×10⁴ or more regardless of the value of the ratio B (%) and hence the salt-bath-nitrided ring 4 has a sufficient level of fatigue-resistant strength. FIG. 7 also indicates that if the ratio B (%) is in the range from 20 to 40%, then the number of times the nitrided ring 4 has endured until it is broken sharply increases, resulting in an large increase in the fatigue-resistant strength.

Figure 8:
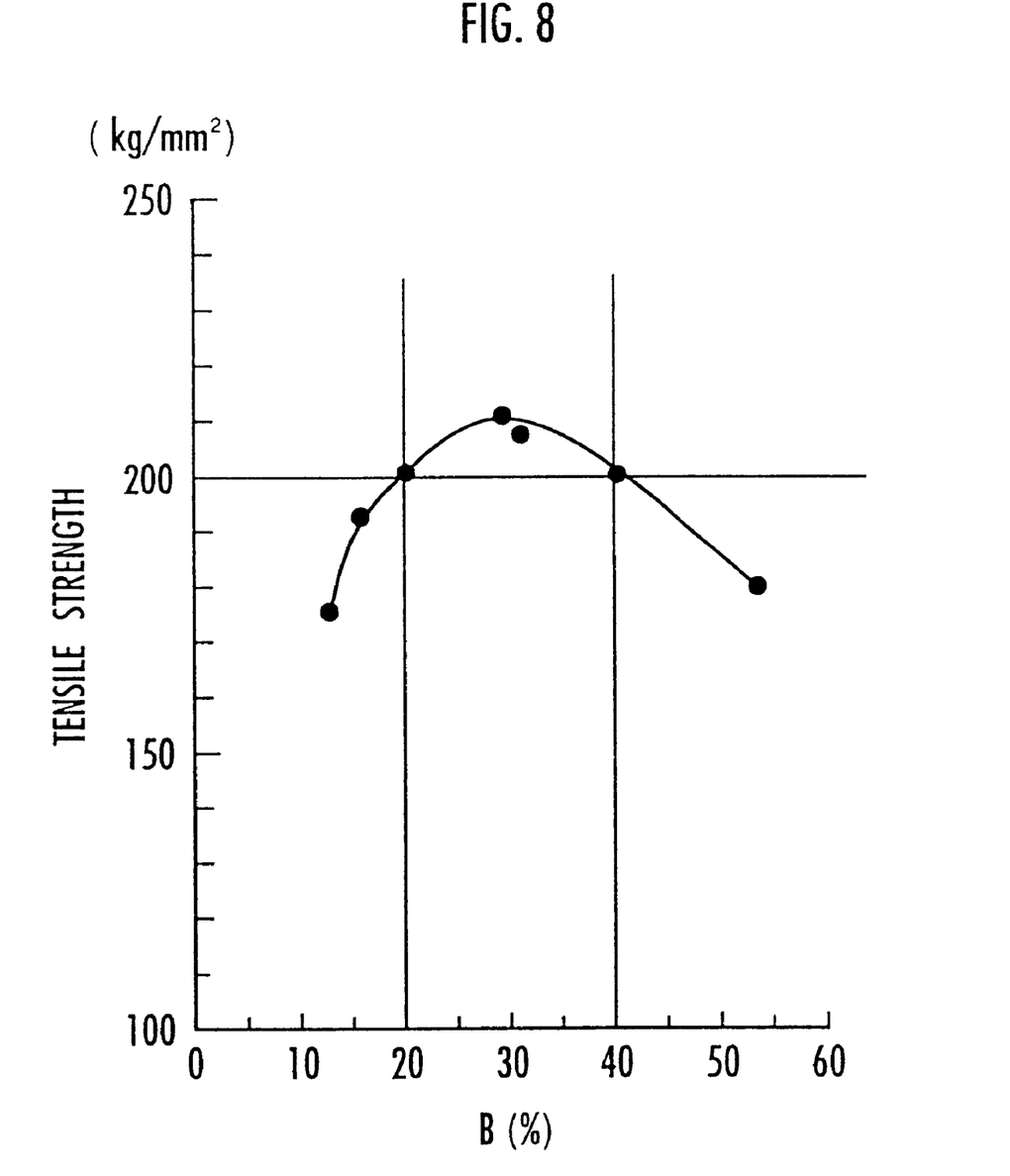
FIG. 8 is a graph showing the relationship between the ratio of the thickness of nitride layers to the overall thickness of a ring and the tensile strength of the ring.

FIG. 8 shows the relationship between the ratio B (%) of the thickness of the nitride layers 9 to the over-all thickness of the ring 4 and the tensile strength of the ring 4. Since the ring 4 is used as in a laminated ring as a continuously variable transmission belt, the tensile strength achieved by the aged layer 10 is required to be 200 kgf/mm² or more. When the aging is not sufficient, the tensile strength cannot be achieved. Even when the aging is sufficient, if the ratio B (%) is excessive, relatively reducing the proportion of the aged layer 10, then the tensile strength cannot be achieved either.

According to the present embodiment, since the ratio B (%) of the thickness of the nitride layers 9 to the overall thickness of the ring 4 is in the range from 20 to 40% because the ring 4 is nitrided according to the salt-bath nitriding process, the tensile strength is 200 kgf/mm² or more, as shown in FIG. 8.

With the ratio B (%) being in the range from 20 to 40%, when the ring 4 is used in a laminated ring as a continuously variable transmission belt, the ring 4 can satisfy requirements for both the fatigue-resistant strength and the tensile strength.

Rings were subjected to the salt-bath nitriding process using a molten salt composition comprising 3.5% of NaCN or KCN, 90% of NaCNO or KCNO, and 6.5% of $Na_2CO_3$ or $K_2CO_3$ according to the present invention, and a conventional molten salt composition comprising 3.5% of NaCN or KCN, 70% of NaCNO or KCNO, and 26.5% of $Na_2CO_3$ or $K_2CO_3$, and the results were compared with each other.

The molten salt 6 prepared by melting, with heat, the above molten salt composition contains 1.5% of CN⁻ and 42% of CNO⁻, and the molten salt 6 prepared by melting, with heat, the conventional molten salt composition contains 1.5% of CN⁻ and 33% of CNO⁻. For both of these molten salts 6, the salt-bath nitriding process was carried out under the conditions of the method according to the present invention that the molten salt is heated to 525° C. and the ring 4 is dipped therein for 20 minutes.

As a consequence, the ring produced by the method according to the present invention using the molten salt composition according to the present invention had nitride layers whose thickness was 17.5 μm, a micro-Vickers surface harness of 945, and a compressive residual stress of −107 kgf/mm². With the ring 4 produced by the method according to the present invention, the thickness of the nitride layers 9 and the aged hardness were uniform, and no white compound was recognized as being separated out. No carbonate was recognized as being separated out from the molten salt composition, and the salt bath tank was not damaged.

The ring produced by the method according to the present invention using the above conventional molten salt composition had nitride layers whose thickness was 17.5 μm, a micro-Vickers surface harness of 935, and a compressive residual stress of −87 kgf/mm². With the ring 4 thus produced, a white compound was recognized as being separated out. A carbonate was recognized as being separated out from the conventional molten salt composition. If the carbonate would be separated out in a large amount, then the salt bath tank would possibly be made shallow, and the service life of the salt bath tank would possibly be reduced due to the heat stored by the separated carbonate.

Figure 9:
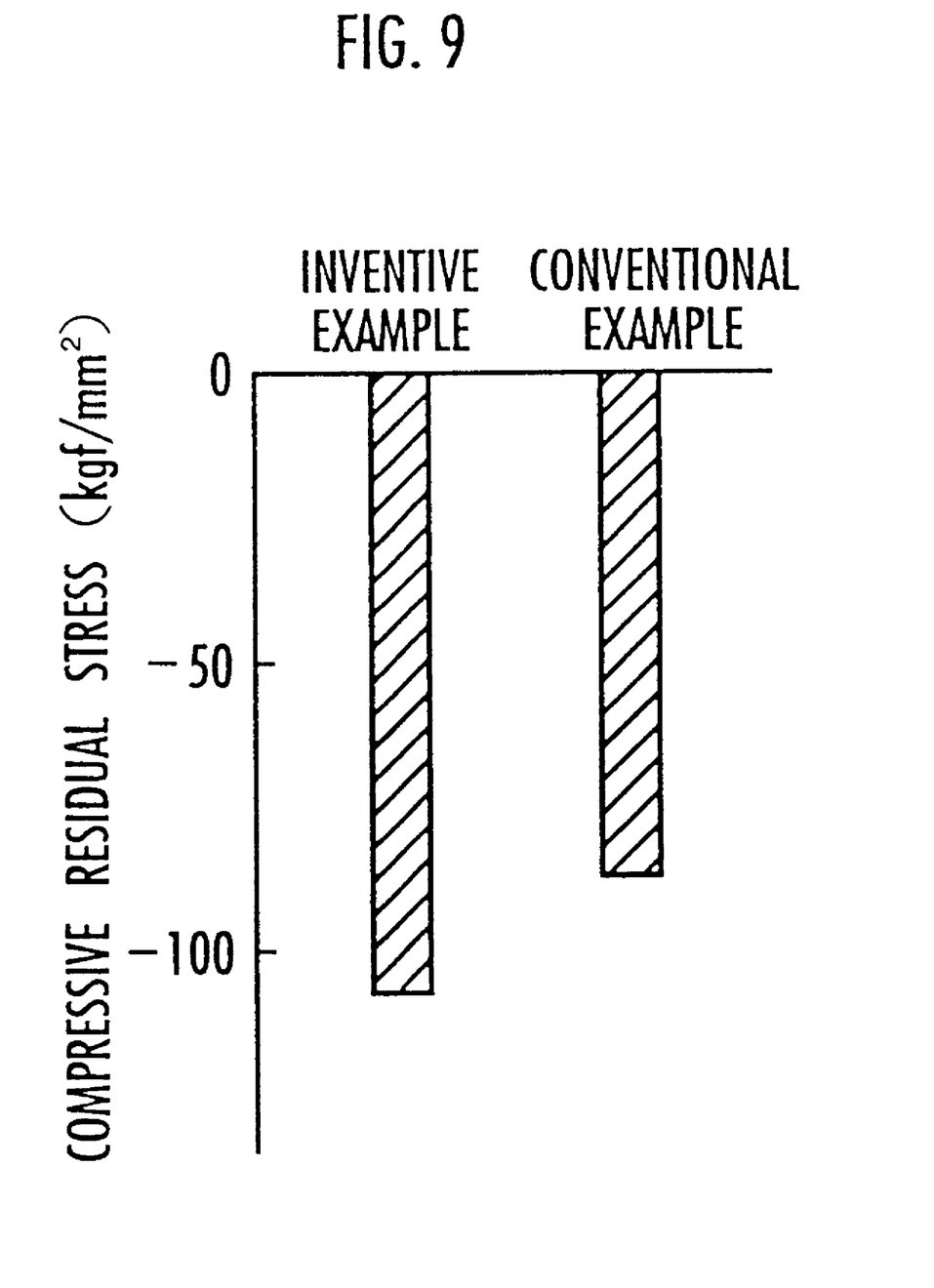
FIG. 9 is a histogram showing, for comparison, compressive residual stresses of rings with nitride layers formed therein.

The compared results of the rings are given in Table shown below. The compared results relative to the compressive residual stresses are also shown in FIG. 9.

TABLE

|  |  | Inventive Example | Comparative Example |
|---|---|---|---|
| Molten salt composition | CNO⁻ (%) | 42 | 33 |
|  | CN⁻ (%) | 1.5 | 1.5 |
| Nitride layer thickness (μm) |  | 17.5 | 17.5 |
| Surface hardness (HMV) |  | 945 | 935 |
| Compressive residual stress (kgf/mm²) |  | −107 | −87 |

It can be seen from Table above that the surface hardness and the compressive residual stress (the sign "−" represents compression) of the ring produced by the method according to the present invention are better than those of the ring produced under the same conditions as those of the method according to the present invention using the conventional molten salt composition. This appears to result from an increased carbo-nitriding action due to the molten salt composition according to the present invention.

Although a certain preferred embodiment of the present invention has been shown and described in detail, it should be understood that various changes and modifications may be made therein without departing from the scope of the appended claims.

What is claimed is:

1. A molten salt composition for use in a process of salt-bath-nitriding a laminated ring for use as a belt in transmitting power in a continuously variable transmission, the laminated ring being produced by welding opposite ends of a sheet of maraging steel to produce a plurality of rings, rolling said rings to a predetermined length, and stacking the rings, said molten salt comprising 3–4 wt % of a cyanide, 89–91 wt % of a cyanate, and the remainder wt % of a carbonate, and heated to a temperature in the range from 480 to 530° C. in the process of salt-bath-nitriding the ring for a period of time ranging from 10 to 25 minutes so that a nitride layer formed in a surface of each of the rings has a thickness ranging from 20 to 40%.

2. A molten salt composition according to claim 1, wherein said cyanide comprises a compound selected from the group consisting of potassium cyanide and sodium cyanide.

3. A molten salt composition according to claim 1, wherein said cyanate comprises a compound selected from the group consisting of potassium cyanate and sodium cyanate.

4. A molten salt composition according to claim 1, wherein said carbonate comprises a compound selected from the group consisting of potassium carbonate and sodium carbonate.

* * * * *